(12) United States Patent
Nagasawa et al.

(10) Patent No.: US 10,246,142 B2
(45) Date of Patent: Apr. 2, 2019

(54) STRUCTURAL MEMBER FOR VEHICLE

(71) Applicant: FUJI JUKOGYO KABUSHIKI KAISHA, Tokyo (JP)

(72) Inventors: Isamu Nagasawa, Tokyo (JP); Satoru Iwata, Tokyo (JP); Kazuhiro Kaminaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 30 days.

(21) Appl. No.: 15/436,156

(22) Filed: Feb. 17, 2017

(65) Prior Publication Data

US 2017/0282982 A1    Oct. 5, 2017

(30) Foreign Application Priority Data

Mar. 31, 2016   (JP) ................................. 2016-071356

(51) Int. Cl.
| | | |
|---|---|---|
| *B62D 35/00* | (2006.01) | |
| *B60R 11/04* | (2006.01) | |
| *B60R 1/12* | (2006.01) | |
| *B62D 37/02* | (2006.01) | |

(52) U.S. Cl.
CPC .............. *B62D 35/008* (2013.01); *B60R 1/12* (2013.01); *B60R 11/04* (2013.01); *B62D 37/02* (2013.01); *B60R 2001/1253* (2013.01)

(58) Field of Classification Search
CPC ....... B62D 35/008; B62D 37/02; B60R 11/04; B60R 1/12; B60R 2001/1253
See application file for complete search history.

(56) References Cited

U.S. PATENT DOCUMENTS

| | | | |
|---|---|---|---|
| 9,855,983 B2 * | 1/2018 | Dogahira | B62D 35/005 |
| 2012/0242833 A1 * | 9/2012 | Yamaguchi | B62D 35/007 |
| | | | 348/148 |
| 2017/0057566 A1 * | 3/2017 | Hommes | B62D 35/00 |

FOREIGN PATENT DOCUMENTS

| | | |
|---|---|---|
| JP | S60-75183 U | 5/1985 |
| JP | 2000-103371 A | 4/2000 |
| JP | 2009-107399 A | 5/2009 |
| JP | 2014-113906 A | 6/2014 |
| JP | 2014-167726 | 9/2014 |

OTHER PUBLICATIONS

Japanese Office Action dated Jul. 18, 2017, in Japanese Patent Application No. 2016-071356 (6 pages—Japanese with English translation).

* cited by examiner

*Primary Examiner* — D Glenn Dayoan
*Assistant Examiner* — Melissa A Black
(74) *Attorney, Agent, or Firm* — Smith, Gambrell & Russell, LLP

(57) ABSTRACT

A structural member for a vehicle projects from a vehicle body. The structural member includes a first airflow surface and a second airflow surface along each of which airflow flows, and an imaging window. The first airflow surface and the second airflow extend between a front edge and a rear edge of the structural member in a front-rear direction of the vehicle body and face away from each other. The first airflow surface has a length longer than a length of the second airflow surface in the front-rear direction. The imaging window is provided in the first airflow surface, and an image of an area outside the vehicle body is captured through the imaging window.

10 Claims, 4 Drawing Sheets

US 10,246,142 B2

STRUCTURAL MEMBER FOR VEHICLE

CROSS-REFERENCE TO RELATED APPLICATIONS

The present application claims priority from Japanese Patent Application No. 2016-071356 filed on Mar. 31, 2016, the entire contents of which are hereby incorporated by reference.

BACKGROUND

1. Technical Field

The present invention relates to a structural member that projects from a vehicle body.

2. Related Art

Vehicles, such as automobiles, include door mirrors as described in Japanese Unexamined Patent Application Publication No. 2014-267726. The door mirrors have mirror surfaces in rear sections thereof. An occupant can visually check traffic conditions, for example, in an area behind the vehicle by looking at the door mirrors.

The door mirrors project leftward and rightward from the side surfaces of the vehicle body, and are required to have mirror surfaces in rear sections thereof. Therefore, airflow that flows along the side surfaces of the vehicle in the front-to-rear direction becomes turbulent due to the door mirrors. Vortex airflow that swirls toward the flat mirror surfaces from above and below may be formed behind the door mirrors. As a result, dirt around the vehicle, splashed mud, and the like may adhere to the mirror surfaces of the door mirrors.

SUMMARY OF THE INVENTION

Accordingly, a structural member for a vehicle that projects from a vehicle body is desirably configured so as to reduce the adhesion of mud, dirt, and the like.

An aspect of the present invention provides a structural member for a vehicle. The structural member projects from a vehicle body and includes a first airflow surface and a second airflow surface along each of which airflow flows, and an imaging window. The first airflow surface and the second airflow extend between a front edge and a rear edge of the structural member in a front-rear direction of the vehicle body and face away from each other. The first airflow surface has a length longer than a length of the second airflow surface in the front-rear direction. The imaging window is provided in the first airflow surface, and an image of an area outside the vehicle body is captured through the imaging window.

The structural member may further include a camera configured to capture the image of the area outside the vehicle body, and the imaging window may be provided for the camera.

The structural member may be provided on each side of the vehicle body so as to project leftward and rightward.

The structural member may have an airfoil section in which the first airflow surface and the second airflow surface face away from each other from the front edge to the rear edge.

The structural member may have a symmetrical airfoil section in which the first airflow surface and the second airflow surface are symmetrically curved. The structural member may be inclined relative to the front-rear direction of the vehicle body so that the first airflow surface faces rearward.

An end portion of the structural member at the rear edge may project in a direction from the first airflow surface toward the second airflow surface.

The structural member may have an asymmetrical airfoil section in which the first airflow surface bulges more than the second airflow surface does.

The first airflow surface may have a communication hole that extends from a bent portion near the front edge to a location near the rear edge.

The second airflow surface may be flat.

An angle of the first airflow surface and the second airflow surface relative to the airflow in the front-rear direction of the vehicle body may be changeable. The structural member may further include a controller capable of controlling the angle of the first airflow surface and the second airflow surface relative to the airflow in the front-rear direction of the vehicle body on the basis of a pressure on the first airflow surface and a pressure on the second airflow surface.

DETAILED DESCRIPTION

An implementation of the present invention will be described with reference to the drawings.

Figure 1A:
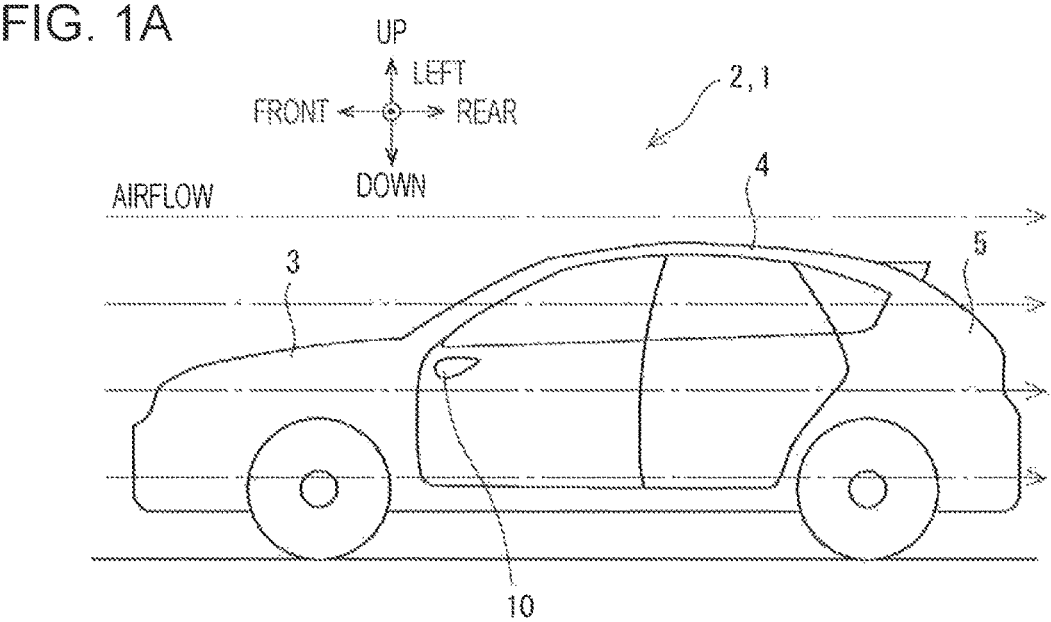
FIGS. 1A and 1B illustrate the relationship between an automobile to which an implementation of the present invention is applied and airflow.
Figure 1B:
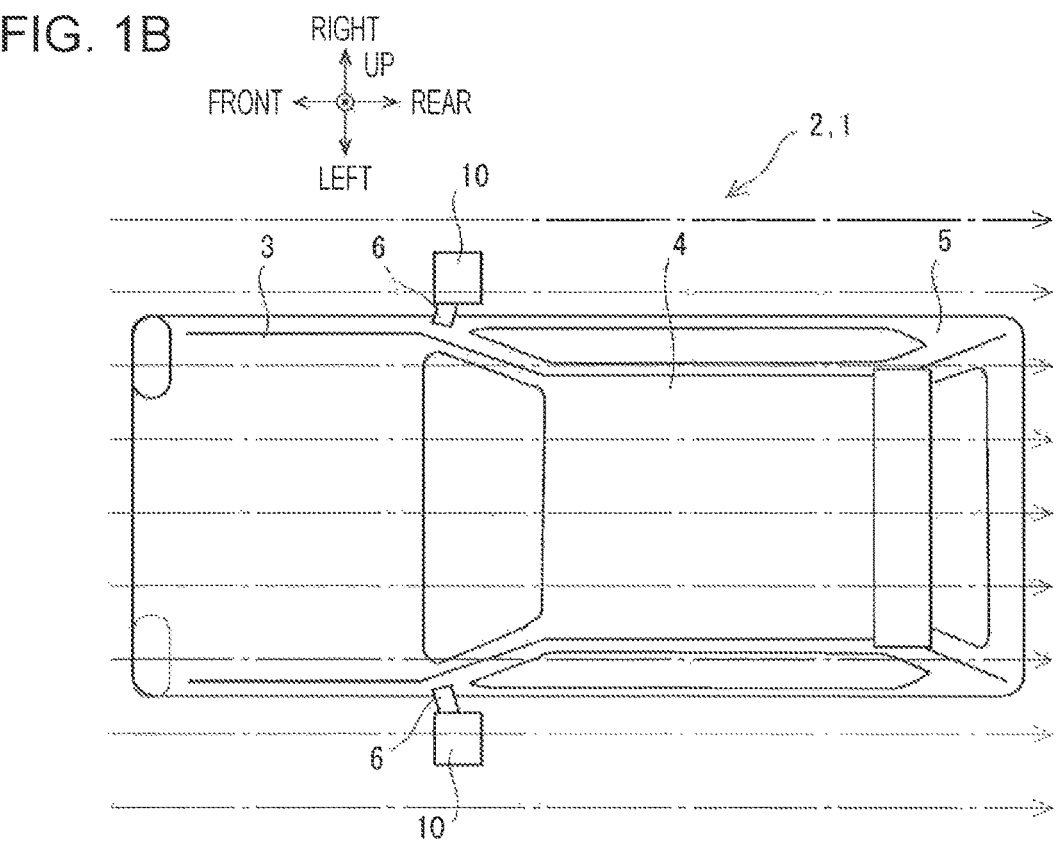

FIGS. 1A and 1B illustrate the relationship between an automobile 1 to which an implementation of the present invention is applied and airflow. FIG. 1A is a side view. FIG. 1B is a top view. The automobile 1 is an example of a vehicle.

The automobile 1 illustrated in FIGS. 1A and 1B includes a vehicle body. The vehicle body 2 includes an occupant section 4 having doors, a front section 3 that projects forward from the occupant section 4, and a rear section 5 that projects rearward from the occupant section 4. The vehicle body 2 has a curved surface having a streamline shape so that substantially uniform airflow that flows in the front-to-rear direction when the automobile 1 moves flows along the curved surface. Since the air resistance is low, good aerodynamic characteristics and high energy efficiency can be obtained. In FIGS. 1A and 1B, the one-dot chain lines indicate the airflow.

Figure 2:
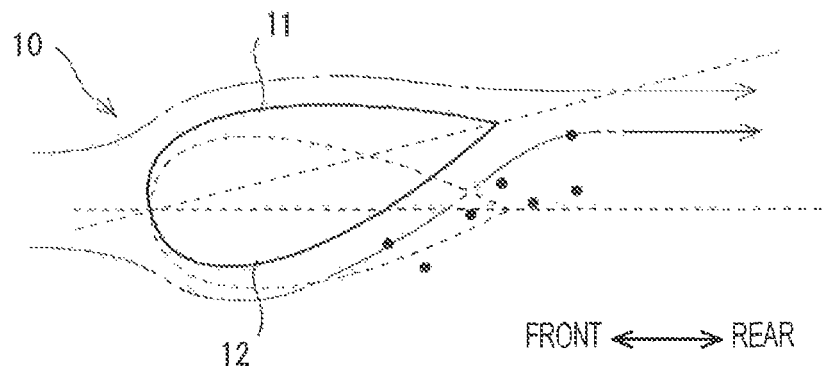
FIG. 2 illustrates the relationship between the shape of a structural member according to the implementation and the airflow.

FIG. 2 illustrates the relationship between the shape of a structural member 10 according to the present implementation and the airflow. The structural member 10 illustrated in FIG. 2 is a substitute for a door mirror, and is provided on each side surface of the vehicle body 2 so as to project leftward and rightward by using stays 6, as illustrated in FIG. 1B.

The structural member 10 illustrated in FIG. 2 extends in a direction perpendicular to FIG. 2 and has a symmetrical airfoil section. The structural member 10 is obliquely oriented so that the rear end is above the front end.

A vertical cross section of the structural member 10 having the symmetrical airfoil section has a shape similar to that of a falling raindrop, as shown by dotted lines in FIG. 2. In the state in which the symmetrical structure is rotated so that the wing chord, which connects the front edge and the rear edge of the symmetric structure, extends in a front-rear direction of the vehicle body 2, an upper wing surface 11 and a lower wing surface 12 of the symmetrical structure, which extend from the front edge to the rear edge and face away from each other, have wing surface shapes that are symmetrical about the wing chord. Owing to the wing surface shapes, airflow that flows near the upper and lower wing surfaces 11 and 12 flows along the upper and lower wing surfaces 11 and 12 without being separated therefrom. In the following description, the airflow that flows near the lower wing surface 12 is referred to as lower airflow, and the airflow that flows near the upper wing surface 11 is referred to as upper airflow.

The structural member 10, which has the symmetrical airfoil section and includes the upper and lower wing surfaces 12 and 12, is inclined relative to the front-rear direction of the vehicle body 2 so that the lower wing surface 22 faces rearward. Accordingly, in the state in which the structural member 10 is attached to the vehicle body 2, a length of the lower wing surface 12 from the front edge to the rear edge in the front-rear direction of the vehicle body 2 is longer than a length of the upper wing surface 11 from the front edge to the rear edge in the front-rear direction of the vehicle body 2. The upper and lower wing surfaces 11 and 12 described in the following description of the present implementation have the above-described definition.

Figure 3:
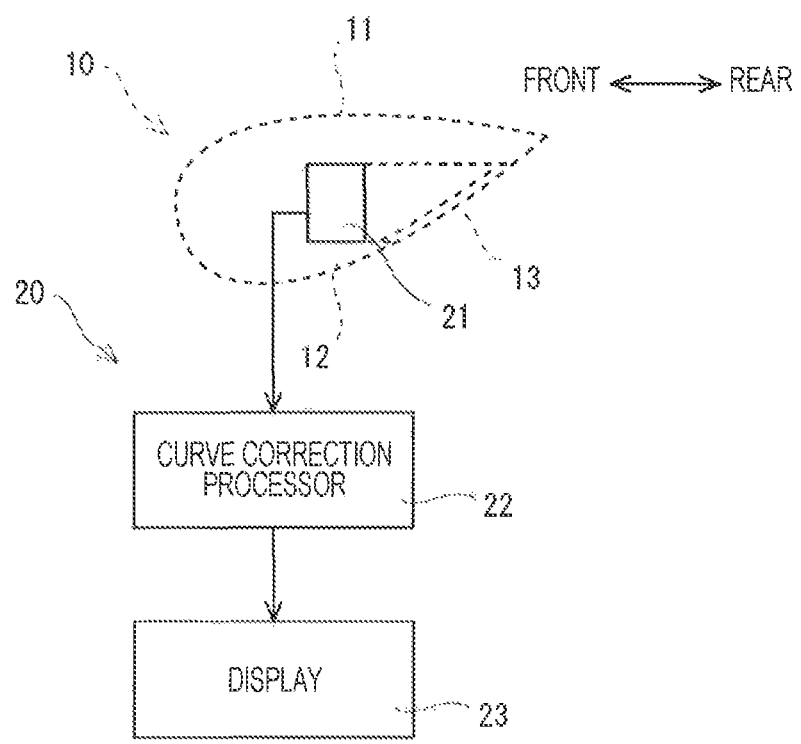
FIG. 3 illustrates a rear monitoring device included in the automobile illustrated in FIGS. 1A and 1B.

FIG. 3 illustrates a rear monitoring device 20 included in the automobile 1 illustrated in FIGS. 1A and 1B.

The rear monitoring device 20 illustrated in FIG. 3 includes a camera 21, a curve correction processor 22, and a display 23.

The camera 21 includes, for example, a semiconductor imaging device. The camera 21 is disposed in each of the structural members 10, which project leftward and rightward from the side surfaces of the vehicle body 2, so as to face rearward.

Each structural member 10 includes an imaging window 13 in a rear section of the lower wing surface 12. The imaging window 13 may be formed of a transparent or translucent resin material that allows visible light to pass therethrough. The surface of the imaging window 13 has a wing surface shape similar to that of the lower wing surface 12. The camera 21 captures an image of an area outside the structural member 10, that is, an area behind the vehicle, through the imaging window 13.

The curve correction processor 22 is coupled to the camera 21. The curve correction processor 22 removes a distortion component caused by the wing-surface-shaped imaging window 13 from the image captured by the camera 21. Accordingly, an undistorted image similar to that obtained by, for example, a flat mirror surface can be obtained.

The display 23 is, for example, a display device. The display 23 may be disposed obliquely in front of a driver's seat in, for example, the occupant section 4. The display 23 is coupled to the curve correction processor 22, and displays the undistorted image supplied by the curve correction processor 22. Accordingly, the driver can check traffic conditions, for example, in the area behind the vehicle by looking at the image displayed on the display 23.

Thus, the camera 21 illustrated in FIG. 3 is disposed in the structural member 10 illustrated in FIG. 2, and captures an image of the area behind the vehicle through the imaging window 13 in the lower wing surface 12 of the structural member 10 having the symmetrical airfoil section.

The structural member 10 illustrated in FIG. 2 has a symmetrical airfoil section, and is disposed on the vehicle body 2 such that the structural member 10 rises toward the rear. The lower wing surface 12 is longer than the upper wing surface 11.

The substantially uniform airflow that flows along each side surface of the vehicle body 2 in the front-to-rear direction flows along the upper wing surface 11 and the lower wing surface 12 of the structural member 10 without becoming turbulent upon encountering the structural member 10. Vortex airflow does not easily occur.

The velocity of the lower airflow that flows along the lower wing surface 12 is higher than that of the upper airflow that flows along the upper wing surface 11. The pressure of the lower airflow that flows along the lower wing surface 12 is lower than that of the upper airflow that flows along the upper wing surface 11.

Accordingly, even when the lower airflow that flows along the lower wing surface 12 carries dirt around the vehicle, splashed mud, and the like as illustrated in FIG. 2, the dirt, mud, and the like do not move toward the imaging window 13 of the lower wing surface 12 but flows toward the area behind the imaging window 13 together with the airflow.

As a result, dirt around the vehicle, splashed mud, and the like do not easily adhere to the imaging window 13.

As described above, according to the present implementation, the structural member 10 of the vehicle projects into the substantially uniform airflow that flows in the front-to-rear direction of the vehicle body 2. The structural member 10 includes the lower wing surface 12 and the upper wing surface 11 along each of which the airflow flows. The lower wing surface 12 and the upper wing surface 11 extend between the front edge and the rear edge of the structural member 10 in the front-rear direction of the vehicle body 2 and face away from each other. The length of the lower wing surface 12 in the front-rear direction is longer than the length of the upper wing surface 11 in the front-rear direction. Therefore, the velocity of the lower airflow that flows along the lower wing surface 12 is higher than that of the upper airflow that flows along the upper wing surface 11, and the pressure on the lower wing surface 12 decreases. As a result, even when the lower airflow carries dirt, mud, and the like, vortex airflow that swirls toward the lower wing surface 12 is not easily generated. Thus, dirt, mud, and the like do not easily adhere to the lower wing surface 12 of the structural member 10.

Since the imaging window 13, through which an image of an area outside the vehicle body 2 is captured, is provided on the lower wing surface 12, the imaging window 13 does not easily become dirty. The structural member 10 may be appropriately used as, for example, a substitute for a door mirror.

According to the present implementation, the camera 21 that captures an image of the area outside the vehicle body 2 is disposed in the structural member 10, and the imaging window 13 is provided for the camera 21. Accordingly, the camera 21 is capable of reliably capturing an image of the area outside the vehicle body 2 for a long time through the imaging window 13, which does not easily become dirty.

In addition, according to the present implementation, the structural member 10 is provided on each side surface of the vehicle body 2 so as to project leftward and rightward. Therefore, the structural member 10 is not easily affected by turbulent airflow generated by the vehicle body 2. The structural member 10 can be arranged so as to project into the substantially uniform airflow that flows in the front-to-rear direction of the vehicle body 2 that moves.

In addition, according to the present implementation, the structural member 10 has an airfoil section in which the lower wing surface 12 and the upper wing surface 11, which extend from the front edge to the rear edge, are downwardly and upwardly convex and face away from each other. Accordingly, the lower airflow that flows along the lower wing surface 12 and the upper airflow that flows along the upper wing surface 11 can be generated. In addition, turbulence of the airflow caused by the structural member 10 can be minimized. Since turbulence of the airflow caused by the structural member 10 can be reduced, deterioration of aerodynamic characteristics of the vehicle can be reduced.

In addition, according to the present implementation, the structural member 10 has a symmetrical airfoil section in which the lower wing surface 12 and the upper wing surface 11 are symmetrically curved. The structural member 10 is inclined relative to the front-rear direction of the vehicle body 2 so that the lower wing surface 12 faces rearward. Accordingly, the velocity of the lower airflow that flows along the lower wing surface 12 is higher than that of the upper airflow that flows along the upper wing surface 11.

The above-described implementation is an example of a preferred implementation of the present invention. However, the present invention is not limited to this, and various modifications and changes are possible within the scope of the present invention.

FIGS. 4A to 4D illustrate modifications of the shape of the structural member 10 illustrated in FIG. 2.

Figure 4A:
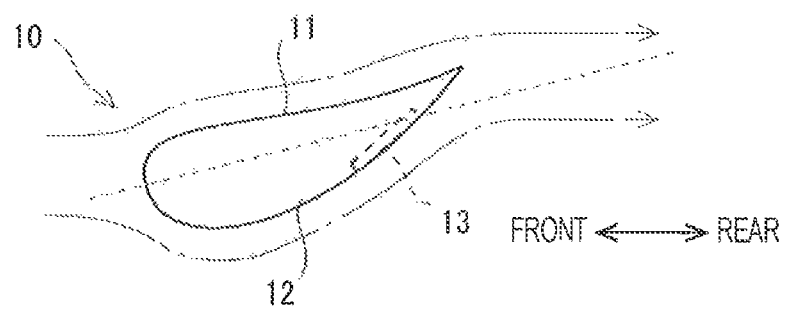
FIGS. 4A to 4D illustrate modifications of the shape of the structural member illustrated in FIG. 2.

FIG. 4A illustrates a structural member 10 including a rear end portion that projects further upward than that of the structural member 10 illustrated in FIG. 2.

When the end portion of the structural member 10 at the rear edge projects in a direction from the lower wing surface 12 toward the upper wing surface 11, the velocity of the lower airflow that flows along the lower wing surface 12 becomes higher than that of the upper airflow that flows along the upper wing surface 11 by a larger amount. Thus, the difference in velocity between the lower airflow and the upper airflow can be increased.

Since the end portion of the structural member 10 at the rear edge projects toward the upper-wing-surface-11 side, the structural member 10 has an asymmetrical airfoil section.

Figure 4B:
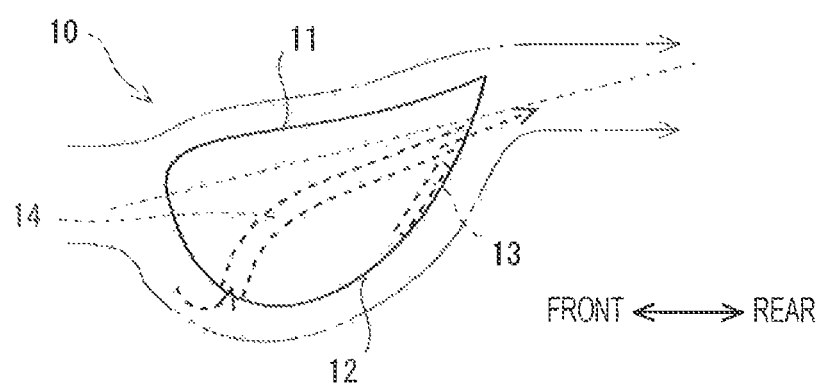

FIG. 4B illustrates a structural member 10 that differs from the structural member 10 illustrated in FIG. 2 in that the lower wing surface 12 bulges more than the upper wing surface 11 does.

When the structural member 10 has an asymmetrical airfoil section in which the lower wing surface 12 bulges more than the upper wing surface 11 does, the velocity of the lower airflow that flows along the lower wing surface 12 is higher than that of the upper airflow that flows along the upper wing surface 11. Thus, the difference in velocity between the lower airflow and the upper airflow can be increased.

In addition, in FIG. 4B, the lower wing surface 12 has a communication hole 14 that extends from a bent portion near the front edge to a location near the rear edge. Part of the lower airflow that flows along the lower wing surface 12 enters the communication hole 14 from the bent portion of the lower wing surface 12 and flows through the communication hole 14 to the location near the rear edge of the lower wing surface 12.

When part of the air is caused to flow into the communication hole 14 from the bent portion of the lower wing surface 12, the airflow is not easily separated from the lower wing surface 12 at the bent portion of the lower wing surface 12. As a result, the lower airflow flows along the lower wing surface 12 over a range including the bent portion.

Figure 4C:
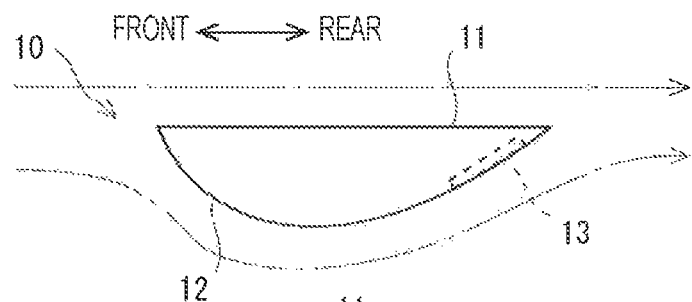

FIG. 4C illustrates a structural member 10 including a flat upper surface. In other words, the upper wing surface 11 is flat. Also in this case, the velocity of the lower airflow that flows along the lower wing surface 12 is higher than that of the upper airflow that flows along the upper wing surface 11.

Figure 4D:
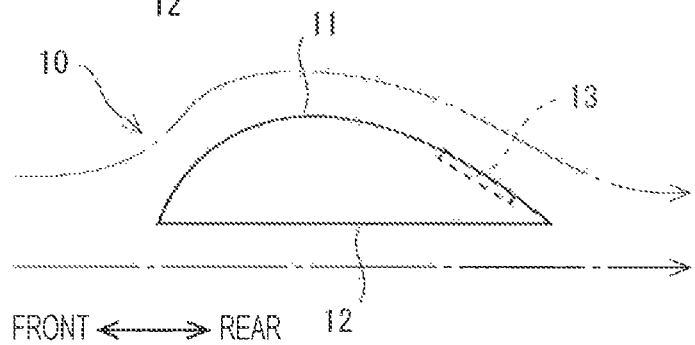

FIG. 4D illustrates a structural member 10 having a shape obtained by vertically inverting the structural member 10 illustrated in FIG. 4C.

In this case, the length of the lower wing surface 12 in the front-rear direction of the vehicle body 2 is shorter than that of the upper wiring surface 11. The velocity of the upper airflow that flows along the upper wing surface 11 is higher than that of the lower airflow that flows along the lower wing surface 12. Therefore, the imaging window 13 is preferably provided in the upper wing surface 11. Also in this case, when the imaging window 13 is provided in the upper wing surface 11 so as to face rearward, dirt and mud do not easily adhere to the imaging window 13.

Figure 5:
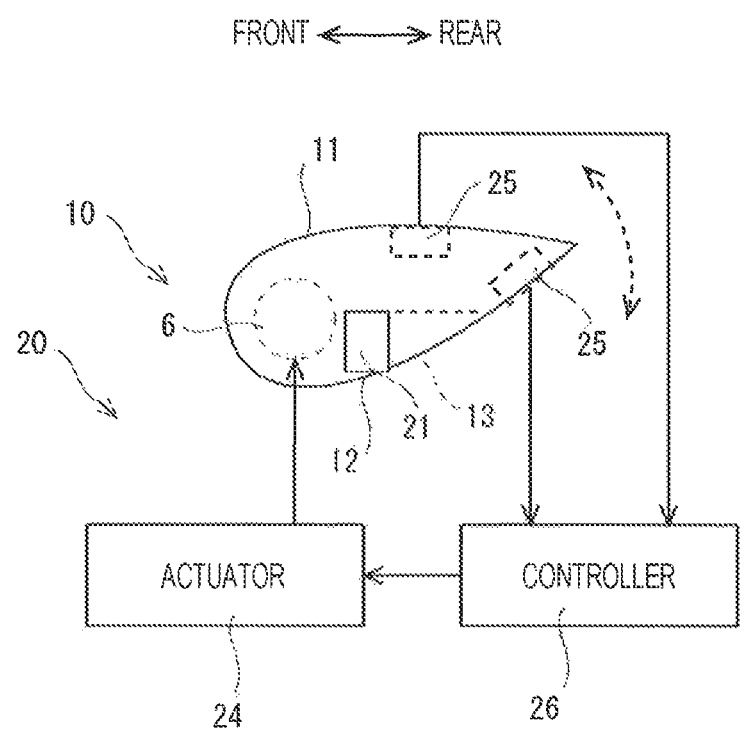
FIG. 5 illustrates a modification in which the structural member according to the implementation is movable.

FIG. 5 illustrates a modification in which the structural member 10 according to the present implementation is movable.

In FIG. 5, the structural member 10 is provided so as to be rotatable around the stay 6 along a vertical plane. More specifically, the angle of the upper and lower wing surfaces 11 and 12, which face away from each other, relative to the airflow in the front-rear direction of the vehicle body 2 is changeable. An actuator 24 is provided to rotate and position the structural member 10 relative to the stay 6. A pair of pressure sensors 25 are provided on the upper and lower wing surfaces 11 and 12 of the structural member 10. Detection values obtained by the pair of pressure sensors 25 are input to a controller 26, which controls the actuator 24.

In this case, the controller 26 operates the actuator 24, for example, so that the difference between the detection value of the lower pressure sensor 25 and the detection value of the upper pressure sensor 25 increases, or so that the detection value of the lower pressure sensor 25 is lower than the detection value of the upper pressure sensor 25 by a predetermined value. Accordingly, the velocity of the lower airflow that flows along the lower wing surface 12 of the structural member 10 can be maintained higher than that of the upper airflow that flows along the upper wing surface 11 of the structural member 10 irrespective of the driving conditions. Thus, the state in which dirt and mud do not easily adhere to the imaging window 13 provided in the lower wing surface 12 can be maintained.

In the case where the above-described control is performed, the curve correction processor 22 illustrated in FIG. 3 preferably causes the display 23 to display a portion of the image captured by the camera 21. When the angle of the structural member 10 relative to the stay 6 is changed, the displayed portion of the captured image is preferably shifted in the opposite direction. Thus, although the orientation of the structural member 10 is variably controlled, an image of an area in a constant direction can always be displayed on the display 23.

The actuator 24, the pair of pressure sensors 25, and the controller 26 illustrated in FIG. 5 are components of the rear monitoring device 20 illustrated in FIG. 3.

The invention claimed is:

1. A structural member for a vehicle, the structural member projecting from a vehicle body, the structural member comprising:

a first airflow surface and a second airflow surface along each of which airflow flows, the first airflow surface and the second airflow extending between a front edge and a rear edge of the structural member in a front-rear direction of the vehicle body and facing away from each other, the first airflow surface having a length longer than a length of the second airflow surface in the front-rear direction; and an imaging window that is provided in the first airflow surface and through which an image of an area outside the vehicle body is captured.

2. The structural member for a vehicle according to claim 1, further comprising a camera configured to capture the image of the area outside the vehicle body, wherein the imaging window is provided for the camera.

3. The structural member for a vehicle according to claim 1, wherein the structural member is provided on each side of the vehicle body so as to project leftward and rightward.

4. The structural member for a vehicle according to claim 1, wherein the structural member has an airfoil section in which the first airflow surface and the second airflow surface face away from each other from the front edge to the rear edge.

5. The structural member for a vehicle according to claim 4, wherein the structural member has a symmetrical airfoil section in which the first airflow surface and the second airflow surface are symmetrically curved, and wherein the structural member is inclined relative to the front-rear direction of the vehicle body so that the first airflow surface faces rearward.

6. The structural member for a vehicle according to claim 4, wherein an end portion of the structural member at the rear edge projects in a direction from the first airflow surface toward the second airflow surface.

7. The structural member for a vehicle according to claim 4, wherein the structural member has an asymmetrical airfoil section in which the first airflow surface bulges more than the second airflow surface does.

8. The structural member for a vehicle according to claim 4, wherein the first airflow surface has a communication hole that extends from a bent portion near the front edge to a location near the rear edge.

9. The structural member for a vehicle according to claim 4, wherein the second airflow surface is flat.

10. The structural member for a vehicle according to claim 1, wherein an angle of the first airflow surface and the second airflow surface relative to the airflow in the front-rear direction of the vehicle body is changeable, and wherein the structural member for a vehicle further comprises a controller capable of controlling the angle of the first airflow surface and the second airflow surface relative to the airflow in the front-rear direction of the vehicle body on the basis of a pressure on the first airflow surface and a pressure on the second airflow surface.

* * * * *